US011991036B2

United States Patent
Wang

(10) Patent No.: US 11,991,036 B2
(45) Date of Patent: May 21, 2024

(54) COMMUNICATION METHOD AND APPARATUS, ENTITY, AND COMPUTER-READABLE STORAGE MEDIUM

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 232 days.

(21) Appl. No.: 17/405,962

(22) Filed: Aug. 18, 2021

(65) Prior Publication Data

US 2021/0377097 A1 Dec. 2, 2021

Related U.S. Application Data

(63) Continuation of application No. PCT/CN2020/086116, filed on Apr. 22, 2020.

(30) Foreign Application Priority Data

May 6, 2019 (CN) .......................... 201910372444.0

(51) Int. Cl.
*H04L 41/04* (2022.01)
(52) U.S. Cl.
CPC .................................. *H04L 41/04* (2013.01)
(58) Field of Classification Search
CPC ....... H04L 41/04; H04L 41/342; H04L 41/40; Y02D 30/00

(Continued)

(56) References Cited

U.S. PATENT DOCUMENTS 9,503,862 B2 11/2016 Meier et al.
2003/0105846 A1 6/2003 Zhao et al.
(Continued)

FOREIGN PATENT DOCUMENTS

CN 101072185 A 11/2007
CN 102427451 A 4/2012
(Continued)

OTHER PUBLICATIONS

"3$^{rd}$ Generation Partnership Project; Technical Specification Group Services and System Aspects; Procedures for the 5G System; Stage 2 (Release 16)", 3GPP, 23502-G02 MCC Corrections, 3$^{rd}$ Generation Partnership Project (3GPP), Mobile Competence Centre, France, Apr. 1, 2019, XP051751807, 419 pgs., Retrieved from the Internet: http://www.3gpp.org/ftp/tsg%5Fsa/WG2%5FArch/Latest%5FSA2%5FSpecs/DRAFT%5FINTERIM/Archive/23502%2Dg02%5FMCC%5FCorrections%2Ezip.

(Continued)

*Primary Examiner* — Mohamed A. Wasel
(74) *Attorney, Agent, or Firm* — Morgan, Lewis & Bockius LLP

(57) ABSTRACT

This application provides a communication method performed at a control function entity. The method includes: receiving N first requests transmitted by N first network function (NF) entities, each of the first requests including a first valid time in which a first NF entity transmitting the first request provides a service; receiving a second request transmitted by a second NF entity, the second request being used for determining a third NF entity from the N first NF entities; and transmitting a first response to the second NF entity, the first response including a first valid time in which a third NF entity provides a service, such that the second NF entity performs service communication with the third NF entity within the first valid time in which the third NF entity (Continued)

provides the service, the third NF entity being included in the N first NF entities.

17 Claims, 4 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2010/0234021 A1* | 9/2010 | Ngai .................... | H04W 48/18 455/433 |
| 2016/0308715 A1* | 10/2016 | Rasanen ................. | H04L 67/10 |
| 2016/0366014 A1* | 12/2016 | Koo .................... | G06F 9/45558 |
| 2018/0026855 A1* | 1/2018 | Ji ....................... | H04L 41/0893 709/223 |
| 2018/0034801 A1* | 2/2018 | Nakano .................. | H04L 9/321 |
| 2018/0268419 A1 | 9/2018 | Zeckser et al. | |
| 2018/0270781 A1 | 9/2018 | Baek et al. | |
| 2019/0253894 A1* | 8/2019 | Bykampadi ............. | H04L 67/51 |
| 2020/0028921 A1* | 1/2020 | Cai ......................... | H04L 67/60 |
| 2021/0250785 A1* | 8/2021 | Örtenblad ............. | H04W 24/02 |

FOREIGN PATENT DOCUMENTS

| | | |
|---|---|---|
| CN | 103516746 A | 1/2014 |
| CN | 104135532 A | 11/2014 |
| CN | 105519200 A | 4/2016 |
| CN | 109639829 A | 4/2019 |
| CN | 110072273 A | 7/2019 |
| EP | 3855705 A1 | 7/2021 |

OTHER PUBLICATIONS

China Mobile, "Pseudo-CR on NF Profile for Nnrf_NFManagement Service Supplement", 3GPP Draft C4-182206, Pseudo-Cr on Nf Profile for Nnrf_NFManagement Service Supplement-V2, $3^{rd}$ Generation Partnership Project (3GPP), Mobile Competence Centre, vol. CT WG4, Canada, Feb. 16, 2018, XP051396440, 3 pgs., Retrieved from the Internet: http://www.3gpp.org/ftp/tsg%5Fct/WG4%5Fprotocollars%5Fex%2DCN4/TSGCT4%5F83%5FMontreal/Docs/.

Extended European Search Report, EP20802157.6, May 27, 2022, 32 pgs.

Nokia et al., "Limiting the number of NFProfiles returned in NFDiscover response", 3GPP Draft, C4-190444, $3^{rd}$ Generation Partnership Project (3GPP), Mobile Competence Centre,vol. CT WG4, Montreal, Canada, Feb. 28, 2019, XP051598927, 9 pgs., Retrieved from the Internet: http://www.3gpp.org/ftp/tsg%5Fct/WG4%5Fprotocollars%5Fex%2DCN4/TSGCT45F89%5FMontreal/Docs/C4%2D190444%2Ezip.

Tencent Technology, KR Office Action, Korean Patent Application No. 10-2021-7027356, Jul. 28, 2022, 15 pgs.

Tencent Technology, ISR, PCT/CN2020/086116, Jul. 20, 2020, 2 pgs.

Tencent, "Update of the NF/NF Service Discovery Result" 3GPP TSG-SA WG2 Meeting #132, S2-1903261, Xi'an, China, Apr. 12, 2019, 3 pgs., Retrieved from the Internet: https://www.3gpp.org/DynaReport/TDocExMtg--S2-132--32862.htm.

Tencent Technology, WO, PCT/CN2020/086116, Jul. 20, 2020, 5 pgs.

Tencent Technology, IPRP, PCT/CN2020/086116, Nov. 2, 2021, 6 pgs.

* cited by examiner

COMMUNICATION METHOD AND APPARATUS, ENTITY, AND COMPUTER-READABLE STORAGE MEDIUM

CROSS-REFERENCE TO RELATED APPLICATIONS

This application is a continuation application of PCT Patent Application No. PCT/CN2020/086116, entitled "COMMUNICATION METHOD AND APPARATUS, ENTITY AND COMPUTER READABLE STORAGE MEDIUM" filed on Apr. 22, 2020, which claims priority to Chinese Patent Application No. 201910372444.0, filed with the State Intellectual Property Office of the People's Republic of China on May 6, 2019, and entitled "COMMUNICATION METHOD AND DEVICE, ENTITY AND STORAGE MEDIUM", all of which are incorporated herein by reference in their entirety.

FIELD OF THE TECHNOLOGY

This application relates to the field of communication technologies, and specifically, to a communication method and apparatus, an entity, and a computer-readable storage medium.

BACKGROUND OF THE DISCLOSURE

Starting from Release 15 of the 5G communication standard formulated by the 3rd Generation Partnership Project (3GPP), a network function (NF) network element and an NF service are introduced into a communication network.

The NF service may be a module located on the NF network element, or may be a module drawn from a virtualized network. An NF network element and an NF service in an operator network can provide one or more specific services in a running state.

SUMMARY

An embodiment of this application provides a communication method. The communication method may include:

receiving, by a control function entity, first requests respectively transmitted by N first NF entities, the first request including a first valid time, the first valid time being corresponding to a service provided by a first NF entity transmitting the first request, and N being an integer greater than 0;

receiving, by the control function entity, a second request transmitted by a second NF entity, the second request being used for determining a third NF entity from the N first NF entities; and transmitting, by the control function entity, a first response to the second NF entity, the first response including a first valid time in which the third NF entity provides a service, for the second NF entity to perform service communication with the third NF entity within the first valid time in which the third NF entity provides the service.

An embodiment of this application provides a communication method. The communication method may include:

transmitting, by a second NF entity, a second request to a control function entity, the second request being used for determining a third NF entity from N first NF entities;

receiving, by the second NF entity, a first response transmitted by the control function entity, the first response including a first valid time in which the third NF entity provides a service, respective first valid times of the N first NF entities being stored on the control function entity. N being an integer greater than 0; and performing, by the second NF entity, service communication with the third NF entity within the first valid time in which the third NF entity provides the service.

An embodiment of this application provides a communication apparatus. The communication apparatus may include:

a receiving module, configured to receive first requests respectively transmitted by N first NF entities, the first request including a first valid time, the first valid time being corresponding to a service provided by a first NF entity transmitting the first request, and N being an integer greater than 0, the receiving module being configured to receive a second request transmitted by a second NF entity, the second request being used for determining a third NF entity from the N first NF entities, and a transmission module, configured to transmit a first response to the second NF entity, the first response including a first valid time in which the third NF entity provides a service, for the second NF entity to perform service communication with the third NF entity within the first valid tune in which the third NF entity provides the service.

An embodiment of this application provides a communication apparatus. The communication apparatus may include:

a transmission module, configured to transmit a second request to a control function entity, the second request being used for determining a third NF entity from N first NF entities;

a receiving module, configured to receive a first response transmitted by the control function entity, the first response including a first valid time in which the third NF entity provides a service, respective first valid times of the N first NF entities being stored on the control function entity, N being an integer greater than 0; and a communication module, configured to perform service communication with the third NF entity within the first valid time in which the third NF entity provides the service.

An embodiment of this application provides a control function entity. The control function entity may include: a transceiver, a processor, and a memory, the memory being configured to storing executable instructions, the transceiver being configured to, when the control function entity runs, perform operations of receiving and transmitting in the communication method provided by the embodiments of this application, and the processor being configured to execute the executable instructions stored on the memory, to perform operations of determining in the communication method provided by the embodiments of this application.

An embodiment of this application provides an NF entity. The NF entity may include: a transceiver, a processor, and a memory, the memory being configured to storing executable instructions, the transceiver being configured to, when the NF entity runs, perform operations of receiving and transmitting in the communication method provided by the embodiments of this application, and the processor executing the executable instructions stored on the memory, to perform operations of determining in the communication method provided by the embodiments of this application.

An embodiment of this application provides a non-transitory computer-readable storage medium, storing executable instructions, the executable instructions, when run on a computer, causing the computer to perform the communication method provided by the embodiments of this application.

DESCRIPTION OF EMBODIMENTS

Embodiments of this application are described below with reference to the accompanying drawings. It is obvious that the described embodiments are merely some rather than all of the embodiments of this application. A person of ordinary skill in the art may learn that as the technology evolves and a new scenario emerges, the technical solutions provided in the embodiments of this application are also applicable to a similar technical problem.

In this specification, claims, and the foregoing accompanying drawings of this application, the terms "first", "second", and so on are intended to distinguish between similar objects rather than indicating a specific order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In the following description, the term "some embodiments" describes subsets of all possible embodiments, but it may be understood that "some embodiments" may be the same subset or different subsets of all the possible embodiments, and can be combined with each other without conflict. In addition, "a plurality of" involved in the following description means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Starting from Release 15 of the 5G communication standard formulated by 3GPP, an NF network element and an NF service are introduced into a communication network. Either of the NF network element and the NF service needs to be in a running state all the time when providing a service, and running of such NF network elements or NF services in a network needs to consume a large amount of electric energy.

To overcome the foregoing defects, the embodiments of this application provide a communication method, to control the use of NF entities by using valid times in which the NF entities provide services, thereby reducing electric energy consumption of the NF entities. Detailed descriptions are separately provided below.

Figure 1A:
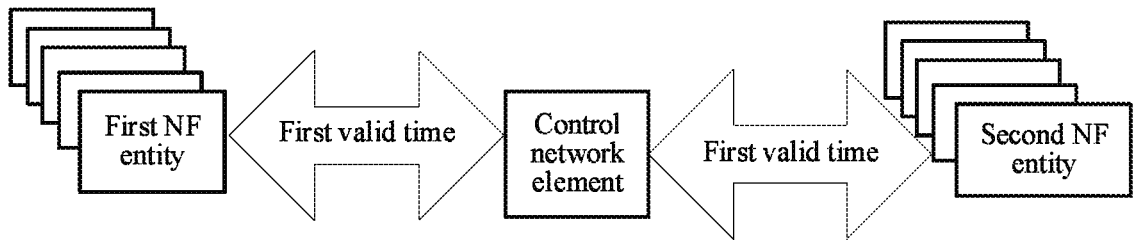
FIG. 1A is a schematic diagram of a network architecture according to an embodiment of this application.

FIG. 1A is a schematic diagram of a network architecture according to an embodiment of this application.

As shown in FIG. 1A, a communication system provided in this embodiment of this application includes first NF entities, a control function entity (a control network element is used as an example in FIG. 1A), and second NF entities.

The first NF entity and the second NF entity may be network elements or modules that perform one or more particular functions in an operator network, or may be NF network elements, or may be NF service modules, or may alternatively be service communication proxy (SCP) network elements.

When being an NF network element, the first NF entity or the second NF entity may include an access and mobility management function (AMF) network element, a session management function (SMF) network element, a user plane function (UPF) network element, a policy control function (PCF) network element, a unified data management (UDM) network element, a unified data repository (UDR) network element, an authentication server function (AUSF) network element, a network slice selection function (NSSF) network element, a network data analytics function (NWDAF) network element, or a network repository function (NRF) network element.

When being an NF service module, the first NF entity or the second NF entity may be a function module of services provided by the foregoing network elements, for example, an AMF service module, an SMF service module, a UPF service module, a PCF service module, a UDM service module, a UDR service module, an AUSF service module, an NSSF service module, an NWDAF service module, or an NRF service module.

When being an SCP network element, the first NF entity or the second NF entity may be a device that acts as proxy to implement functions of the foregoing NF network element or NF service module.

The control function entity may be a network element with functions of registration and storage, for example, a network repository function (NRF) network element. The control function entity may alternatively be a service module with functions of registration and storage, for example, an NRF service module.

In this embodiment of this application, there may be one or more first NF entities and there may also be one or more second NF entities. Each first NF entity has a first valid time. The first NF entity may transmit the first valid time of the first NF entity to the control function entity, and the control function entity stores the first valid time of each first NF entity. When needing to use a third NF entity, the second NF entity may obtain a first valid time of the third NF entity from the control function entity. The third NF entity is one or more of the first NF entities.

One of the first NF entity and the second NF entity may be used as a producer, and the other is used as a consumer. For example, when an SMF network element is used as a first NF entity an AMF network element may be used as a second NF entity. When a source AMF network element is used as a first NF entity, a target AMF network element may be used as a second NF entity. When a source SMF network element is used as a first NF entity, a target SMF network element may be used as a second NF entity. When a UPF network element is used as a first NF entity, an SMF network element may be used as a second NF entity. When a PCF network element is used as a first NF entity, an AMF network element may be used as a second NF entity, and an SMF network element may also be used as a second NF entity. Certainly, a relationship between a producer and a consumer between entities is not limited to the types listed herein. If two entities can communicate with each other, the entities may establish the relationship between a producer and a consumer between the first NF entity and the second NF entity. Certainly, the producer and the consumer may be at a level of SCP network element.

Both the producer and the consumer described above are at a network-element level. In fact, there may be further corresponding service modules under each network-element level. For example, an AMF network element may include one or more AMF service modules, which may be marked as AMF service 1, AMF service 2, AMF service 3, . . . , or the like, and an SMF network element may include one or more SMF service modules, which may be marked as SMF service 1, SMF service 2, SMF service 3, . . . , or the like. When the SMF service 1, the SMF service 2, the SMF service 3, . . . , or the like is used as a first NF entity, the AMF service 1 may be used as a second NF entity. Certainly, the AMF service 2 may also be used as a second NF entity, Such a manner is merely described as an example in this embodiment of this application. In fact, for any other relationship between service modules of network elements, analogy may be made based on the foregoing relationship between a producer and a consumer between the network elements.

The foregoing relationship between a producer and a consumer is relative and is not fixed, and may be determined according to different use scenarios. This is not limited in this embodiment of this application.

Figure 1B:
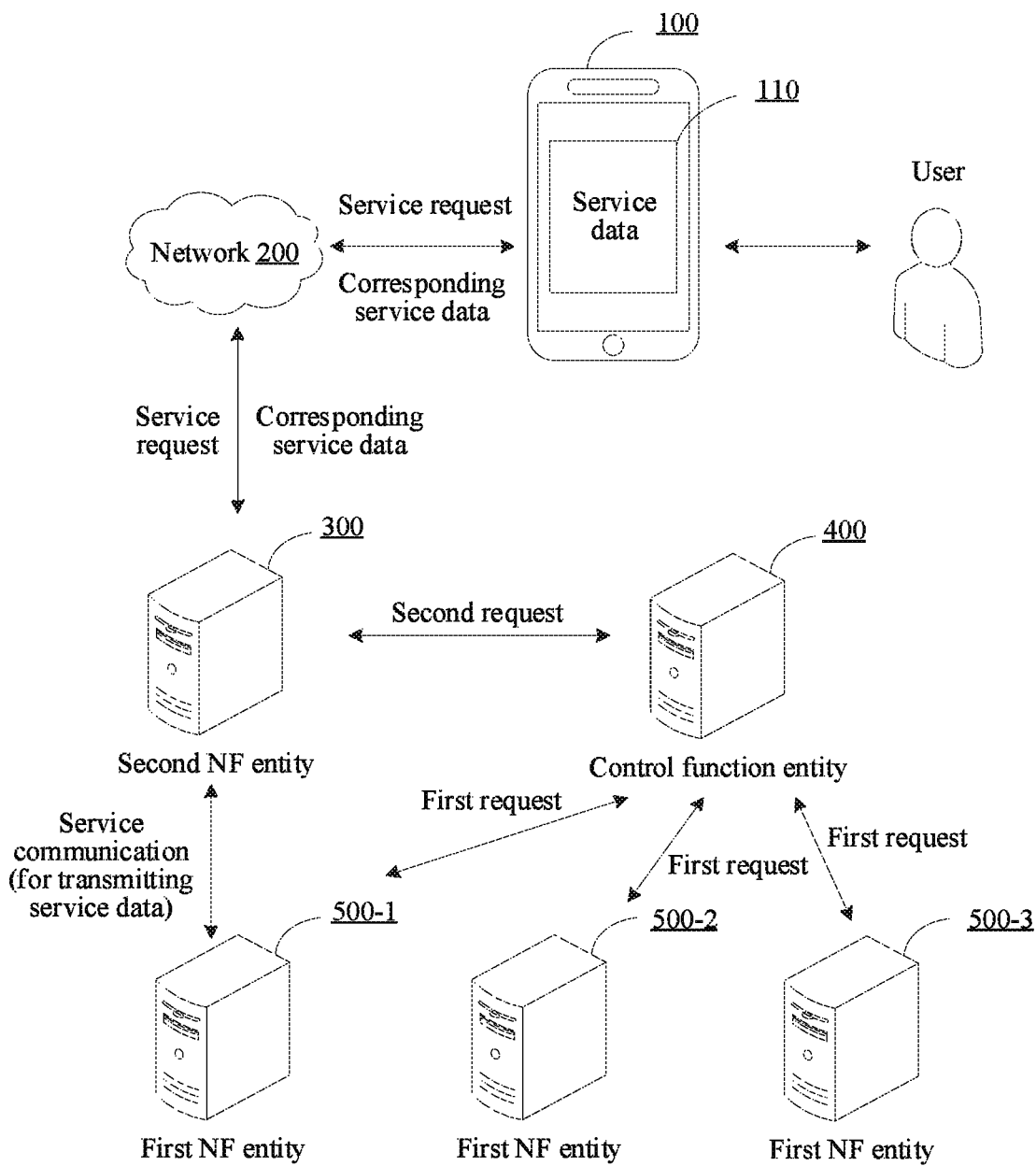
FIG. 1B is a schematic diagram of a network architecture according to an embodiment of this application.

For ease of description, an embodiment of this application further provides a schematic diagram of a network architecture shown in FIG. 1B. A terminal device 100 is connected to a second NF entity 300 by a network 200. The network 200 may be a wide area network or a local area network, or a combination of a wide area network and a local area network. The terminal device 100 may be implemented as various types of terminal devices such as a notebook computer, a tablet computer, a desktop computer, a set-top box, or a mobile device (for example, a mobile phone, a portable music player, a personal digital assistant, a dedicated messaging device, or a portable game device). In FIG. 1B, only a case that the terminal device 100 is a mobile terminal device is used as an example.

In FIG. 1B, a control function entity 400 receives first requests respectively transmitted by N first NF entities 500. The first request includes a first valid time and the first valid time corresponds to a service provided by a first NF entity 500 transmitting the first request. A case that N is 3 is used as an example. The control function entity 400 locally stores received first valid times of a first NF entity 500-1, a first NF entity 500-2, and a first NF entity 500-3. A user may transmit a service request to the second NF entity 300 by using the terminal device 100, for requesting required service data. A type of the service request is not limited herein, for example, may be a video request, a navigation request, or a sensor data request. After receiving the service request, the second NF entity 300 generates a second request according to the service request, and transmits the second request to the control function entity 400. For example, the generated second request may include an entity type of a first NF entity that can provide service data (that is, service data corresponding to the service request). In addition, the second request may further include network slice information, data network name (DNN), location information of the terminal device 100, valid time information, and the like.

The control function entity 400 determines a third NF entity from the first NF entities 500-1 to 500-3 according to the received second request. In an example in which all the first NF entities 500-1 to 500-3 are of the entity type in the second request, if the valid time information included in the second request is a time period of 19:00 to 20:00 (for example, the user needs to browse videos during the time period), and the first valid time of the first NF entity 500-1 is 16:00 to 24:00, the first valid time of the first NF entity 500-2 is 8:00 to 16 00, and the first valid time of the first NF entity 500-3 is 0:00 to 8:00, the control function entity 400 determines the first NF entity 500-1 as the third NF entity.

Next, the control function entity 400 transmits a first response to the second NF entity 300. The first response includes the first valid time in which the first NF entity 500-1 provides a service. After receiving the first response, the second NF entity 300 may perform service communication with the first NF entity 500-1 within the first valid time in which the first NF entity 500-1 provides the service, that is, obtain service data provided by the first NF entity 500-1, and transmit the service data to the terminal device 100 by using the network 200. The terminal device 100 may display the obtained service data in a graphical interface 110. According to the foregoing manner, NF entities can be dynamically controlled by using valid times, thereby improving validity of service communication.

In addition, for operators of NF entities, electric energy consumption of the NF entities can be reduced. For example, on workdays, users generally work in business districts during the day, and return to their homes at night (most of which are not in the business districts). That is, the users generally use NF entities deployed in the business districts during the day, and use NF entities in non-business districts at night. In this embodiment of this application, on workdays, operators may partially disable NF entities in the business districts at night, and partially disable NF entities in the non-business districts during the day. In addition, on weekends and statutory holidays, during the day, operators may partially disable NF entities in the business districts, and enable all NF entities in the non-business districts. In this way, communication efficiency can be improved, and power consumption of NF entities and an entire communication network can be reduced.

Based on the network architectures described in FIG. 1A and FIG. 1B, a communication method in an embodiment of this application is described below with reference to FIG. 2.

Figure 2:
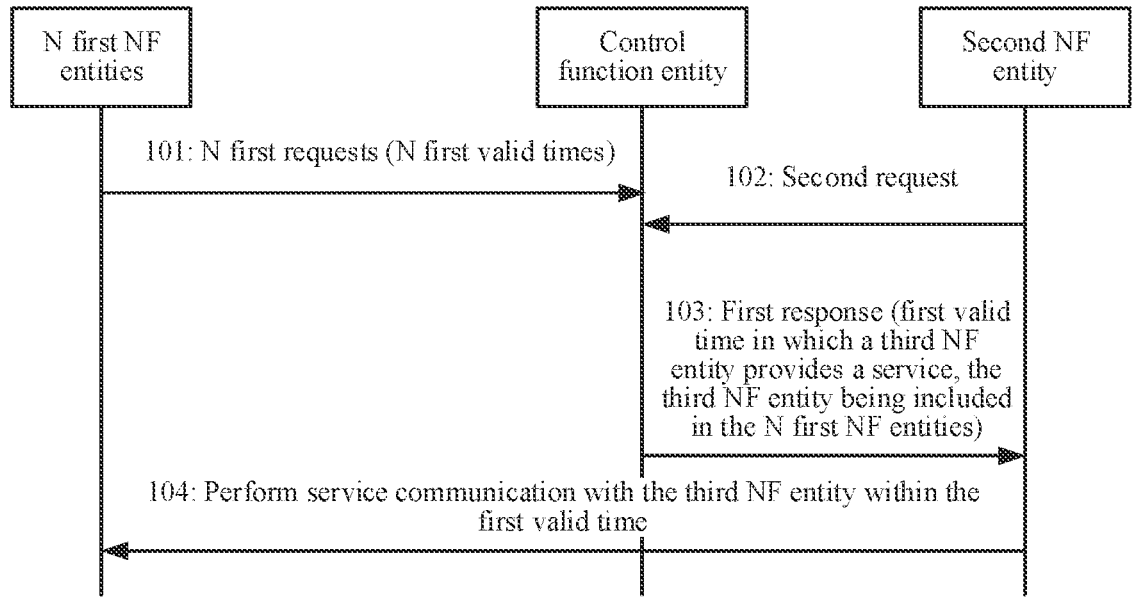
FIG. 2 is a schematic diagram of a communication method according to an embodiment of this application.

As shown in FIG. 2, the communication method provided by this embodiment of this application may include the following steps:

Step 101: A control function entity receives first requests respectively transmitted by N first NF entities. Correspondingly, the N first NF entities respectively transmit the first requests to the control function entity.

Each first request includes a first valid time in which a first NF entity transmitting the first request provides a service, N being an integer greater than 0.

In this embodiment of this application, each first NF entity has a first valid time in which the first NF entity provides a service. Respective first valid times of the N first NF entities may be the same or different. Entity types of the N first NF entities may be the same or different.

The first valid time may be a time period in which the first NF entity provides a service, or may be other time information that can indicate a time range in which the first NF entity provides a service.

The first request may be a registration request or a request of another type. A type of the first request is not limited as long as the first valid time of the first NF entity can be transmitted to the control function entity.

After receiving the first requests respectively transmitted by the N first NF entities, the control function entity may record correspondences between identifier information of the first NF entities and the respective first valid times. The correspondences may be recorded in the form of a list as shown in Table 1:

TABLE 1

| List of the correspondences between the identifier information of the first NF entities and the respective first valid times | |
|---|---|
| Identifier information of first NF entity | First valid time |
| Entity identifier 1 | Valid time 1 |
| Entity identifier 2 | Valid time 2 |
| Entity identifier 3 | Valid time 3 |
| ... | ... |
| Entity identifier N | Valid time N |

Certainly, Table 1 is used merely as an example. Actually, the form of expression in Table 1 is not limited to the manner recorded in Table 1. For example, the identifier information may be represented by a character string, and the first valid time may be represented by a value indicating a specific time period or may be represented in another manner. This is not limited in this embodiment of this application.

The identifier information in Table 1 may be identifiers of NF network elements or identifiers of NF service modules.

In a case that the identifier information is identifiers of NF network elements, for example, the NF network elements are SMF network elements, Table 1 may be represented in the form of Table 2.

TABLE 2

| List of correspondences between identifier information of SMF network elements and respective first valid times | |
|---|---|
| Identifier information of SMF network element | First valid time |
| SMF network element identifier 1 | Valid time 1 |
| SMF network element identifier 2 | Valid time 2 |
| SMF network element identifier 3 | Valid time 3 |
| ... | ... |
| SMF network element identifier N | Valid time N |

In a case that the identifier information is identifiers of NF service modules, for example, the NF service is an SMF service, Table 1 may be represented in the form of Table 3.

TABLE 3

| List of correspondences between identifier information of SMF service modules and respective first valid times | |
|---|---|
| Identifier information of SMF service module | First valid time |
| SMF service module identifier 1 | Valid time 1 |
| SMF service module identifier 2 | Valid time 2 |
| SMF service module identifier 3 | Valid time 3 |
| ... | ... |
| SMF service module identifier N | Valid time N |

In a case that the identifier information is identifiers of SCP network elements, Table 1 may be represented in the form of Table 4.

TABLE 4

| List of correspondences between identifier information of SCP network elements and respective first valid times | |
|---|---|
| Identifier information of SCP network element | First valid time |
| SCP network element identifier 1 | Valid time 1 |
| SCP network element identifier 2 | Valid time 2 |
| SCP network element identifier 3 | Valid time 3 |
| ... | ... |
| SCP network element identifier N | Valid time N |

Step 102: The control function entity receives a second request transmitted by a second NF entity. Correspondingly, the second NF entity transmits the second request to the control function entity.

The second request may be a query request or a request of another type. The second request is used for obtaining information about a third NF entity in the N first NF entities.

Step 103: The control function entity transmits a first response to the second NF entity. Correspondingly, the second NF entity receives the first response transmitted by the control function entity.

The first response includes a first valid time in which the third NF entity provides a service. The third NF entity is included in the N first NF entities.

Step 104: The second NF entity performs service communication with the third NF entity within the first valid time in which the third NF entity provides the service.

In the solution provided in this embodiment of this application, the first NF entity provides, for the control function entity, the first valid time in which the first NF entity provides the service, and the second NF entity then requests, from the control function entity, the first valid time of the third NF entity that is included in the N first NF entities and then performs communication with the third NF entity within the first valid time. In the solution, services of the NF entities are controlled according to the valid times, thereby reducing electric energy consumption of the NF entities.

In some embodiments, the second request may include an entity type of the third NF entity. The entity type is a function type or a device type of the first NF entities, for example, ANTE, SMF, UPF, PCF, UDM, UDR, AUSF, NSSF, NWDAF, or NRF.

The service communication between the second NF entity and the third NF entity is generally established for a service requested by a terminal. Therefore, in the second request, the second NF entity clearly indicates an entity type of an NF entity that is required by the second NF entity to the control function entity. For example, in a scenario of the Internet of Vehicles, if the second NF entity is an AMF entity, the entity type included in the second request is type information of an SMF entity.

In a case that the second request includes the entity type of the third NF entity, the method may further include: determining, by the control function entity, a first entity set corresponding to the entity type from the N first NF entities, the first entity set including the third NF entity.

The second request further includes at least one of the following: network slice information, a DNN, location information of the terminal that requests the service from the second NF entity, and valid time information. The control function entity may determine the third NF entity from the first entity set according to at least one of the network slice information, the DNN, the location information of the terminal that requests the service from the second NF entity, and the valid time information.

In this embodiment of this application, the network slice information may be a network slice type. A 5th generation (5G) network uses the form of network slicing, thereby allocating network resources of proper characteristics for services with different requirements. Different services have different requirements, and types of network slices are also different. Certainly, the solution provided by this embodiment of this application is not limited to being applied to the 5G network, but is applicable to any network that includes network slices.

Network slices have various types, for example, enhanced mobile broadband (eMBB), ultra-reliable and low-latency communication (URLLC), and massive Internet of Things (mIoT). Certainly, the types of the network slices are not limited to the types listed herein. Network slices may further have a custom type.

Network slices of the types have respective characteristics, and are applicable to different fields. For example, eMBB is mainly used in applications such as an ultra-high-definition video, a holographic technology, augmented reality, and virtual reality, which have high requirements for network bandwidths and rates; URLLC is mainly applied to fields such as auto driving, Internet of Vehicles, automatic factories, and remote medical, which require low latency and high reliability; mIoT is mainly applied to the deployment of massive IoT sensors in measurement, architecture, agriculture, logistics, smart city, and smart home, which do not have high requirements for latency and mobility.

Renters may rent network slices of different types according to requirements. Most renters are enterprises providing various applications.

Network slicing is actually the division of radio access network resources, core network resources, and transmission resources. When various types of slices provide services for users, the corresponding radio access network resources, core network resources, and transmission resources provide service support for the users.

The network slice involved in this embodiment of this application may also be briefly referred to as slice, including but not limited to a slice, a slice instance, or a slice subnet instance. The slice may be uniquely identified by using a single network slice selection assistance information (S-NSSAI) identity (ID), the slice instance may be uniquely identified by using a network slice information (NSI) ID, and the slice subnet instance may be uniquely identified by using a network slice selection information (NISSI) ID.

A DNN is a type of a network accessed by a terminal.

For the location information of the terminal that requests the service from the second NF entity, the location information of the terminal may indicate a location of the terminal, and may include at least one of a public land mobile network identity (PLMN ID), a tracking area identity (TAI), and a cell global identity (CGI). Certainly, the location information of the terminal may further include other information used for indicating a location. In this way, when determining the third NF entity, a third NF entity covering the location of the terminal may be determined as much as possible.

The valid time information may be information about a required valid duration, for example, 5 minutes or 1 hour. In this way, the control function entity may determine a more accurate third NF entity during selection.

Certainly, the third NF entity suitable for performing service communication with the second NF entity is determined by the control function entity according to the foregoing series of parameters.

In some embodiments, when the control function entity may determine a plurality of third NF entities and not all the third NF entities are needed by the second NF entity, selection may be further performed, and a selection process may be as follows: The second NF entity determines a fourth NF entity from the third NF entities according to at least one of valid time information, entity capacity information, and entity priority information; and the second NF entity performs service communication with the fourth NF entity within a first valid time in which the fourth NF entity provides a service.

The valid time information herein may be obtained by making an analogy according to the valid time information in the second request.

The entity capacity information is remaining capacity of the third NF entity. For example, if the control function entity provides a plurality of third NF entities, and some of the third NF entities have remaining capacity that does not meet a current service requirement, such third NF entities are excluded, and a third NF entity having remaining capacity that meets the current service requirement is selected for providing service communication. In a case that the remaining capacity of all the third NF entities meets the current service requirement, a third NF entity with maximum remaining capacity is selected for providing the service communication, so as to ensure load balance of the entire communication system, thereby preventing local overload of the system and improving the reliability of the system.

The entity priority information is a priority identifier of the third NF entity. Generally, each third NF entity may have a priority identifier, and the second NF entity selects a third NF entity with the highest priority from the plurality of third NF entities to provide the service communication.

Figure 3:
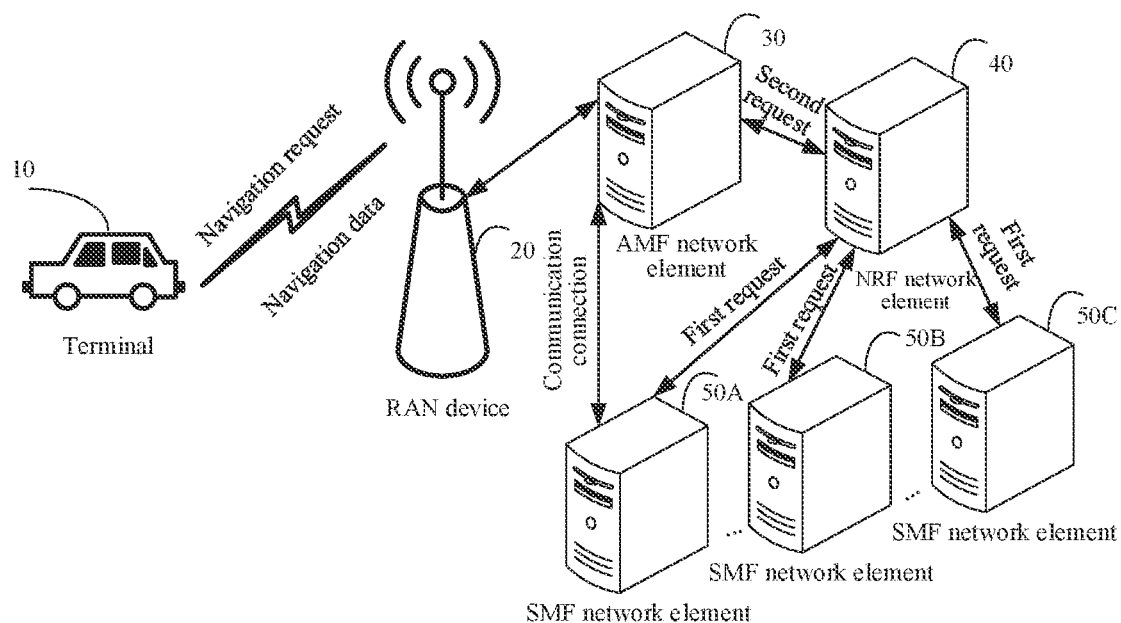
FIG. 3 is an exemplary schematic diagram of a scenario of Internet of Vehicles according to an embodiment of this application.

The process in which the control function entity determines the third NF entity according to the foregoing entity type and at least one of the foregoing series of parameters such as the network slice information, the DNN, the location information of the terminal that requests the service from the second NF entity, and the valid time information may be understood with reference to an Internet of Vehicles scenario shown in FIG. 3.

The Internet of Vehicles scenario shown in FIG. 3 includes a terminal 10, a radio access network (RAN) device 20, an AMF network element 30, an NRF network element 40, an SMF network element 50A, an SMF network element 50B, and an SMF network element 50C. The AMF network element 30, the NRF network element 40, the SMF network element 50A, the SMF network element 50B, and the SMF network element 50C shown in FIG. 3 are all independent devices. Actually, FIG. 3 is merely for ease of representation. The AMF network element 30, the NRF network element 40, the SMF network element 50A, the SMF network element 50B, and the SMF network element 50C may be independent devices or resource blocks that are drawn from a cloud network and have corresponding functions. Representation forms of such network elements as the AMF network element 30, the NRF network element 40, the SMF network element 50A, the SMF network element 50B, and the SMF network element 50C are not limited in this embodiment of this application.

In the scenario, all the SMF network element 50A, the SMF network element 50B, and the SMF network element 50C may be first NF entities, and the SMF network element 50A, the SMF network element 50B, and the SMF network element 50C may respectively transmit, through first requests, respective first valid times to the NRF network element 40 for recording.

The terminal 10 initiates a navigation request. The navigation request is transmitted to the AMF network element 30 by using the RAN device 20. In a case that the second NF entity is the AMF network element 30, the AMF network element 30 transmits a second request to the NRF network element 40. The second request may include information indicating that an entity type is an SMF network element, and the second request may further include at least one of the following: network slice information, a DNN, location information of a terminal that requests a service from the second NF entity, and valid time information.

The NRF network element 40 may determine a first SMF network element set from various types of network elements recorded by the NRF network element according to the information indicating that the entity type is an SMF network element. The first SMF network element set includes a series of SMF network elements.

In a case that the second request further includes the network slice information, the NRF network element 40 may further determine a second SMF network element set suitable for the Internet of Vehicles scenario from the first SMF network element set according to the network slice information. The second SMF network element set also includes a plurality of SMF network elements.

If the second request further includes the DNN and the location information of the terminal that requests the service from the second NF entity, the NRF network element 40 may further determine a third SMF network element set from the second SMF network element set according to the DNN and the location information of the terminal that requests the service from the second NF entity. The third SMF network element set may also include a plurality of SMF network elements.

For example, the NRF network element 40 may further perform screening to obtain SMF network elements of which the coverage is closer to the terminal 10 from the second SMF network element set to form the third SMF network element set. Next, the NRF network element 40 provides the third SMF network element set to the AMF network element 30, for the AMF network element 30 to make selection. For example, the third SMF network element set includes the SMF network element 50A, the SMF network element 50B, and the SMF network element 50C. The AMF network element 30 may select the SMF network element according to at least one of the valid time information, the entity capacity information, and the entity priority information.

Descriptions are made below by using an example in which the SMF network element is jointly determined according to the valid time information and the entity capacity information.

The AMF network element 30 selects the SMF network element according to the valid time information. For example, the AMF network element 30 needs to provide a navigation service for 2 hours. If it is already 19:00, a first valid time in which the SMF network element 50A provides a service is 6:00 to 22:00, a first valid time in which the SMF network element 50B provides a service is 4:00 to 20:00, and a first valid time in which the SMF network element 50C provides a service is 5:00 to 21:00, it may be determined that both the SMF network element 50A and the SMF network element 50C may be selected.

The AMF network element 30 further makes selection between the SMF network element 50A and the SMF network element 50C according to the entity capacity information. If both capacity of the SMF network element 50A and that of the SMF network element 50C can meet a requirement of the current navigation service, the SMF network element 50A with larger capacity may be selected for providing the navigation service for the terminal.

The scenario is merely described by using an example in which the third SMF network element set includes the SMF network element 50A, the SMF network element 50B, and the SMF network element 50C. Actually, the third SMF network element set may include more SMF network elements. If there are more SMF network elements, an SMF network element with the highest priority or at a top priority ranking may be further selected according to the priority information to provide the navigation service for the terminal.

The AMF network element 30 establishes service communication with the SMF network element 50A to provide the navigation service for the terminal 10, and returns navigation data to the terminal 10.

Actually, in the scenario shown in FIG. 3, only the SMF network element 50A, the SMF network element 50B, and the SMF network element 50C are marked. In actual use, SMF network elements covering various time periods provide services. Such SMF network elements do not need to be in a service state together all the time, so that the power consumption of the SMF network elements can be effectively reduced.

In addition, the foregoing merely describes an idea of selecting a third NF entity. The NRF network element 40 may provide at least two SMF network elements for the AMF network element 30, and use one of the provided SMF network elements as a backup SMF network element, so as to ensure high availability of the SMF network elements in the service process.

In addition, the foregoing second request does not include the valid time information. Therefore, the NRF network element 40 selects the SMF network element 50B into the third SMF network element set. If the second request includes the valid time information, the NRF network element 40 does not select the SMF network element 50B into the third SMF network element set.

The AMF network element 30 makes selection according to the valid time information, and excludes the SMF network element 50B. If the AMF network element 30 does not make selection according to the valid time information, and selects the SMF network element 50B to provide a service for the terminal, the NRF network element 40 may also provide the SMF network element 50A for the AMF network element 30 in time before the expiration of the first valid time 4:00 to 20:00 of the SMF network element 50B, that is, switch the service communication, thereby avoiding affecting the service of the terminal 10.

The Internet of Vehicles scenario is used as an example in FIG. 3, and therefore, the terminal 10 may be a wireless terminal or a navigation terminal in an auto driving vehicle.

In another scenario, the terminal (or may be referred to as user equipment (UE)) is a device with a wireless transceiver function. The device may be deployed on the land, including an indoor or outdoor device, a handheld device, or an in-vehicle device; or may be deployed on the water (for example, on a steamship); or may be deployed in the air (for example, on an airplane, a balloon, or a satellite). The terminal may be a mobile phone, a tablet computer (Pad), a computer with a wireless transceiver function, a virtual reality (VR) terminal, an augmented reality (AR) terminal, a wireless terminal in industrial control, a wireless terminal in remote medical, a wireless terminal in a smart grid, a wireless terminal in transportation safety, a wireless terminal in a smart city, a wireless terminal in a smart home, or the like.

The first valid times of the N first NF entities in this embodiment of this application may be updated according to a requirement. A process of updating first valid times of some first NF entities in this embodiment of this application is described below with reference to FIG. 4.

Figure 4:
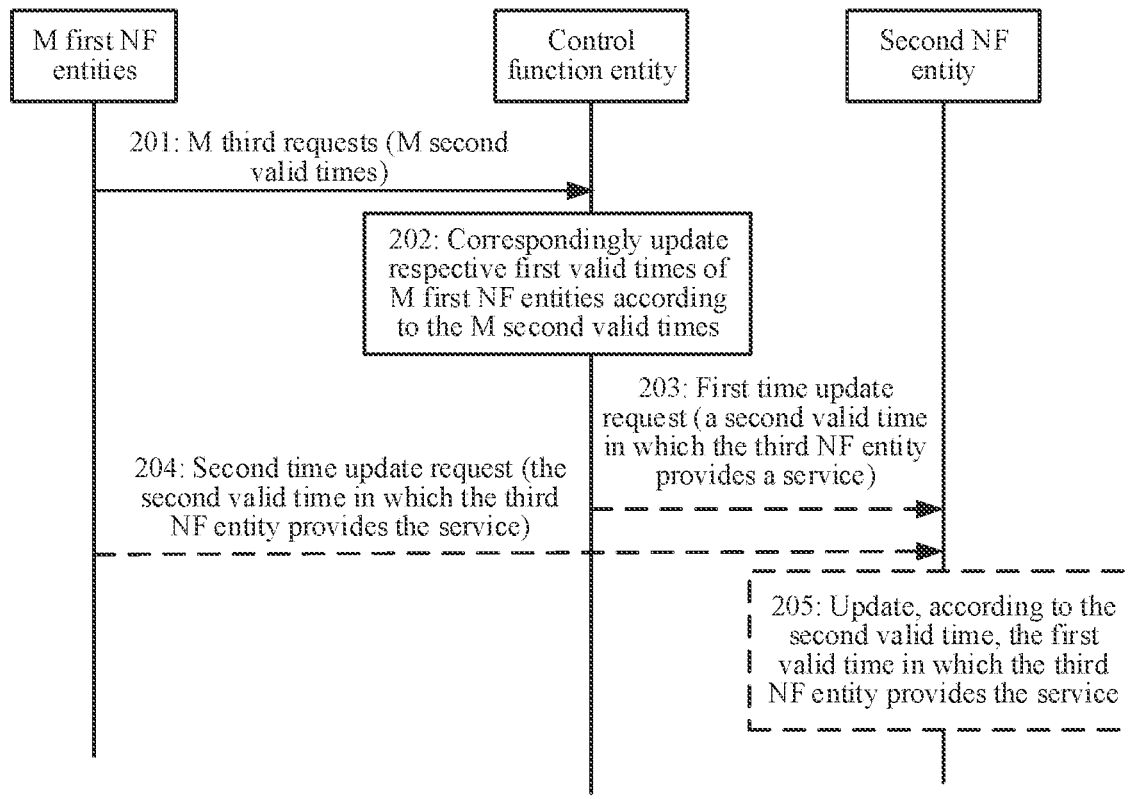
FIG. 4 is a schematic diagram of a communication method according to an embodiment of this application.

As shown in FIG. 4, a communication method provided by this embodiment of this application may include the following steps:

Step 201: A control function entity receives third requests respectively transmitted by M first NF entities. Correspondingly, the M first NF entities respectively transmit the third requests to the control function entity.

Each of the third requests includes a second valid time in which a first NF entity transmitting the third request provides a service, M being an integer greater than 0 and less than or equal to N. For example, M may be 1.

The second valid time may be time range information used for replacing a first valid time, or may be an offset relative to the first valid time, for example, an offset extended forward or shortened backward at a start time point of the first valid time, or an offset extended backward or shortened forward at an end time point of the first valid time. A limited valid time may be further changed to a limitless valid time, or a limitless valid time may be changed to a limited valid time.

Step 202: The control function entity correspondingly updates respective first valid times of the M first NF entities according to M second valid times.

If the first valid times are recorded in the form of, for example, Table 1, the valid times of the corresponding first NF entities in Table 1 may be correspondingly updated according to the second valid times.

If the second valid time is time range information that may replace the first valid time, the first valid time may be replaced with the second valid time.

If the second valid time is an offset relative to the first valid time, the first valid time may be extended by or shortened by a value conforming to the offset according to the offset, to obtain a new valid time.

Step 203: A second NF entity receives a first time update request transmitted by the control function entity. Correspondingly, the control function entity transmits the first time update request to the second NF entity.

The first time update request includes a second valid time in which the third. NF entity provides a service.

Step 203 is performed only when the second NF entity and the third NF entity are still performing the service communication. In addition, if the second NF entity and the third NF entity are still performing the service communication, step 204 may alternatively be performed.

Step 204: The second NF entity receives a second time update request transmitted by the third NF entity.

The second time update request includes a second valid time in which the third NF entity provides a service.

The second valid time in which the third NF entity provides the service can be updated faster through step 204.

Step 205: The second NF entity updates, according to the second valid time, the first valid time in which the third NF entity provides the service.

Regardless of wheeler step 203 or step 204 is performed, step 205 is performed.

According to the solution of updating a valid time provided by this embodiment of this application, the configuration flexibility of the valid times of the NF entities and the use accuracy of a consumer can be ensured.

In terms of the control function entity, the communication method provided by this embodiment of this application may further include: monitoring, by the control function entity, the respective first valid times of the N first NF entities; and deleting relevant information of Q first NF entities when first valid times of the Q first NF entities expire, the relevant information including the first valid times of the Q first NF entities, Q being an integer greater than 0 and less than or equal to N.

In terms of the second NF entity, the communication method provided by this embodiment of this application may further include: deleting relevant information of the third NF entity after the first valid time of the third NF entity expires, to interrupt the service communication with the third NF entity, the relevant information including the first valid time of the third NF entity.

In this embodiment of this application, after the valid time expires, the control function entity or the second NF entity directly deletes relevant information without notifying another entity, thereby saving network overheads caused by notification signaling, and also implementing time-based automatic control of the NF entities.

The network architecture and the communication method involved in the embodiments of this application are described above. Communication apparatuses provided by embodiments of this application are described below with reference to accompanying drawings.

Figure 5:
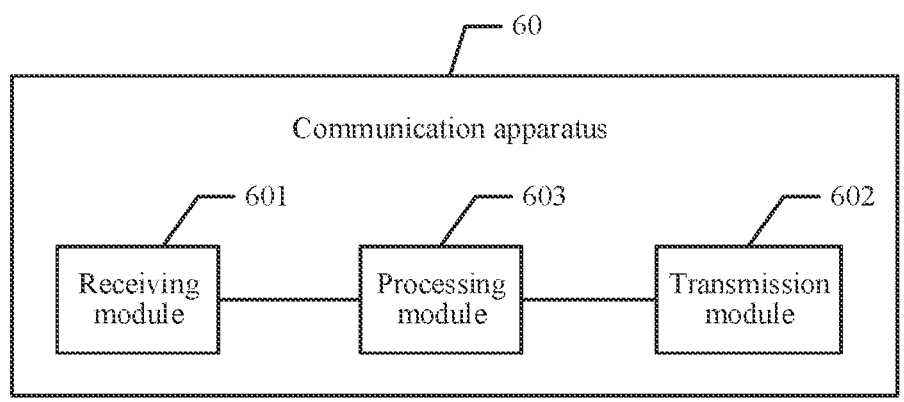
FIG. 5 is a schematic diagram of a communication apparatus according to an embodiment of this application.

As shown in FIG. 5, a communication apparatus 60 provided by an embodiment of this application may include: a receiving module 601, configured to receive first requests respectively transmitted by N first NF entities, the first request including a first valid time, the first valid time being corresponding to a service provided by a first NF entity transmitting the first request, and N being an integer greater than 0, the receiving module 601 being configured to receive a second request transmitted by a second NF entity, the second request being used for determining a third NF entity from the N first NF entities; and a transmission module 602, configured to transmit a first response to the second NF entity, the first response including a first valid time in which the third NF entity provides a service, for the second NF entity to perform service communication with the third NF entity within the first valid time in which the third NF entity provides the service.

In the solution provided in this embodiment of this application, the first NF entity provides, for the control function entity, the first valid time in which the first NF entity provides the service, and the second NF entity then requests, from the control function entity, the first valid time of the third NF entity that is included in the N first NF entities and then performs communication with the third NF entity within the first valid time. In the solution, services of the NF entities are controlled according to the valid times, thereby reducing electric energy consumption of the NF entities.

In some embodiments, the respective first valid times of the N first NF entities are the same.

In some embodiments, the communication apparatus further includes a processing module 603. The processing module 603 is configured to determine, when the second request includes an entity type of the third NF entity, a first entity set corresponding to the entity type from the N first NF entities, the first entity set including the third NF entity.

In some embodiments, the processing module 603 is configured to determine the third NF entity from the first entity set according to content included in the second request when the second request includes at least one of network slice information, a DNN, location information of a terminal that requests a service from the second NF entity, and valid time information.

In some embodiments, the receiving module 601 is configured to receive third requests respectively transmitted by M first NF entities, the third request including a second valid time in which a first NF entity transmitting the third request provides a service, and M being an integer greater than 0 and less than or equal to N. The processing module 603 is configured to correspondingly update respective first valid times of the M first NF entities according to M second valid times.

In some embodiments, M for the M first NF entities is 1.

In some embodiments, the processing module 603 is configured to monitor the respective first valid times of the N first NF entities; and delete relevant information of Q first NF entities when first valid times of the Q first NF entities expire, the relevant information including the first valid times of the Q first NF entities, Q being an integer greater than 0 and less than or equal to N.

In some embodiments, the first NF entity is an NF network element, an NF service module, or an SCP. The second NF entity is an NF network element, an NF service module, or an SCP.

Figure 6:
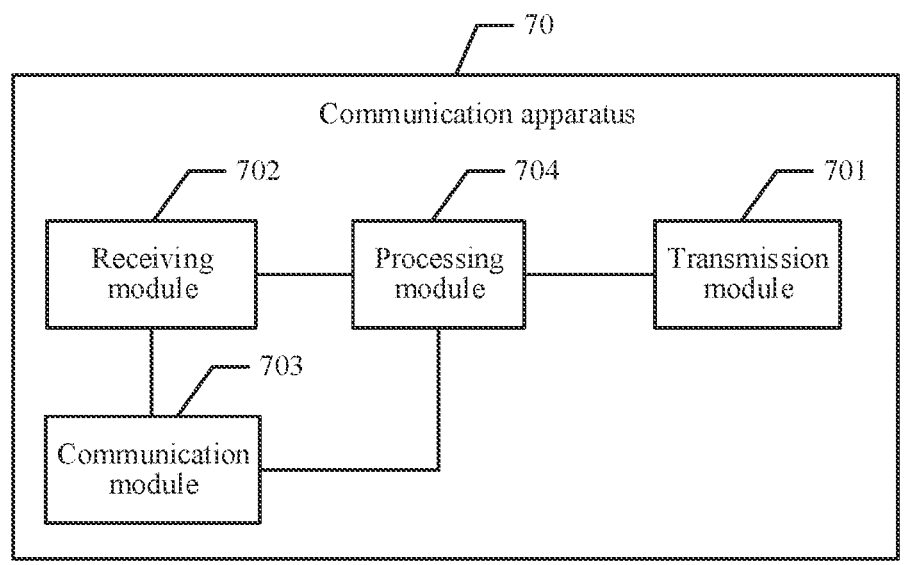
FIG. 6 is a schematic diagram of a communication apparatus according to an embodiment of this application.

As shown in FIG. 6, a communication apparatus 70 provided by an embodiment of this application may include: a transmission module 701, configured to transmit a second request to a control function entity, the second request being used for determining a third NF entity from N first NF entities; a receiving module 702, configured to receive a first response transmitted by the control function entity, the first response including a first valid time in which the third NF entity provides a service, respective first valid times of the N first NF entities being stored on the control function entity, N being an integer greater than 0; and a communication module 703, configured to perform service communication with the third NF entity within the first valid time in which the third NF entity provides the service.

In the solution provided in this embodiment of this application, the second NF entity requests, from the control function entity, the first valid time of the third NF entity that is included in the N first NF entities and then performs communication with the third NF entity within the first valid time. In the solution, services of the NF entities are controlled according to the valid times, thereby reducing electric energy consumption of the NF entities.

In some embodiments, the second request includes an entity type and further includes at least one of network slice information, a DNN, location information of a terminal that requests a service from the second NF entity, and valid time information.

In some embodiments, the communication apparatus 70 further includes a processing module 704. The processing module 704 is configured to determine a fourth NF entity from the third. NF entities according to at least one of valid time information, entity capacity information, and entity priority information. The communication module 703 is configured to perform service communication with the fourth NF entity within a first valid time in which the fourth NF entity provides a service.

In some embodiments, the receiving module 702 is configured to receive a first time update request transmitted by the control function entity, the first time update request including a second valid time in which the third NF entity provides a service. The processing module 704 is configured to update, according to the second valid time, the first valid time in which the third NF entity provides the service.

In some embodiments, the receiving module 702 is configured to receive a second time update request transmitted by the third NF entity, the second time update request including the second valid time in which the third NF entity provides the service. The processing module 704 is configured to update, according to the second valid time, the first valid time in which the third NF entity provides the service.

In some embodiments, the processing module 704 is configured to delete relevant information of the third NF entity after the first valid time of the third NF entity expires, to interrupt the service communication with the third NF entity, the relevant information including the first valid time of the third NF entity.

The foregoing describes the solutions provided in the embodiments of this application mainly from the perspective of interaction between entities. It may be understood that, to implement the foregoing functions, the control function entity, the first NF entity, or the second NF entity includes corresponding hardware structures and/or software modules for performing the functions. A person skilled in the art is to be easily aware that, in combination with the functions described in the embodiments disclosed in this specification, the embodiments of this application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it is not to be considered that the implementation goes beyond the scope of the embodiments of this application.

In terms of a physical apparatus, the control function entity, the first NF entity, or the second NF entity may be implemented by one physical apparatus, or may be jointly implemented by a plurality of physical apparatuses, or may be a logical function unit in a physical apparatus. This is not specifically limned in this embodiment of this application.

Figure 7:
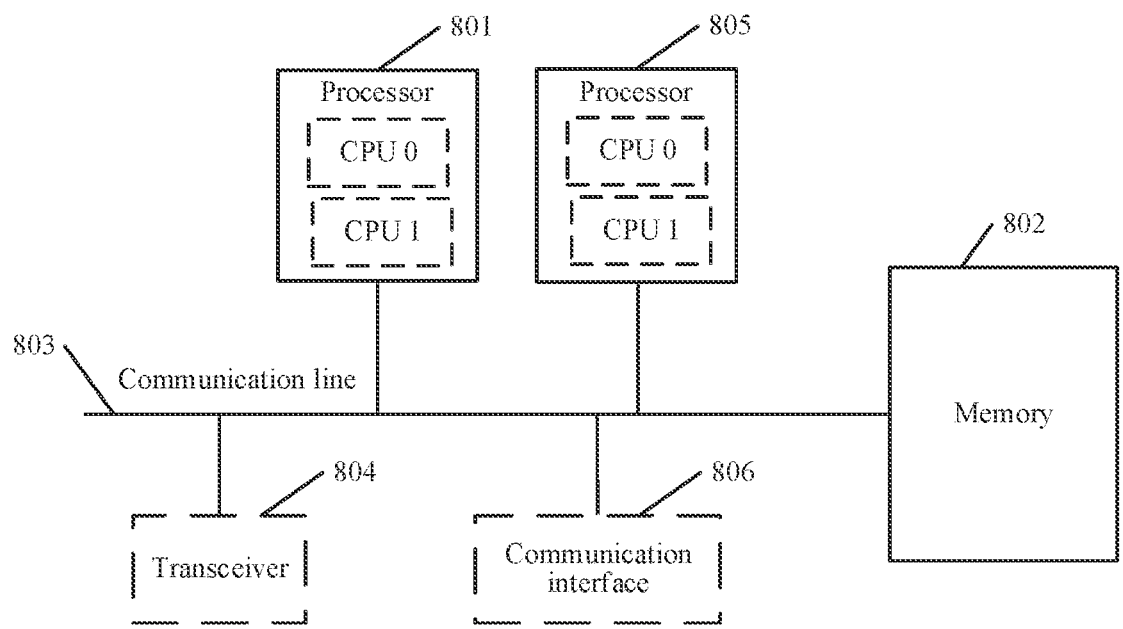
FIG. 7 is a schematic diagram of a communication device according to an embodiment of this application.

For example, the control function entity, the first NF entity, or the second NF entity may be implemented by using the communication device in FIG. 7. FIG. 7 is a schematic structural diagram of hardware of a communication device according to an embodiment of this application. The communication device includes at least one processor 801, a memory 802, and a communication line 803. The communication device may further include at least one of a transceiver 804 and a communication interface 806.

The processor 801 may be a general-purpose central processing unit (CPU), a microprocessor, an application-specific integrated circuit (ASIC), or one or more integrated circuits configured to control execution of a program in the solutions of this application.

The communication line 803 may include a channel, to transmit information between the foregoing components.

The transceiver 804 is an apparatus using any transceiver-type apparatus, and is configured to communicate with another device or a communication network such as the Ethernet, a radio access network (RAN), or a wireless local area network (WLAN). The transceiver 804 may alternatively be a transceiver circuit or a transceiver machine. In a case that the communication device is the first NF entity, the second NF entity, or the control function entity, the communication device may include the transceiver.

The communication device may further include the communication interface 806.

The memory 802 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and connect to the processor 801 by using the communication line 803. The memory 802 may alternatively be integrated with the processor 801.

The memory 802 is configured to store executable instructions for executing the communication method provided by the embodiments of this application, and the processor 801 controls the execution. The processor 801 is configured to execute the executable instructions stored in the memory 802, to implement the communication method provided by the embodiments of this application.

In one implementation, the executable instructions in this embodiment of this application may also be referred to as application code. This is not specifically limited in this embodiment of this application.

During specific implementation, in an embodiment, the processor 801 may include one or more CPUs, for example, a CPU 0 and a CPU 1 in FIG. 7.

During specific implementation, in an embodiment, the communication device may include a plurality of processors, for example, a processor 801 and a processor 805 in FIG. 7. Each of these processors may be a single-core (single-CPU) processor, or may be a multi-core (multi-CPU) processor. The processor herein may be one or more devices or circuits, and/or a processing core configured to process data (for example, executable instructions).

In terms of the function unit, this embodiment of this application may perform function unit division for the control function entity, the first NF entity, or the second NF entity. For example, various function units may be obtained through division according to the corresponding functions, or two or more functions may be integrated into one function unit. The integrated function unit may be implemented in the form of hardware, or may be implemented in the form of a software function unit.

The receiving module 601, the transmission module 602, the transmission module 701, and the communication module 703 all may be implemented by using the transceiver 804.

Both the processing module 603 and the processing module 704 may be implemented by using the processor 801 or the processor 805.

All or some of the foregoing embodiments may be implemented by using software, hardware, firmware, or any combination thereof. When software is used for implementation, implementation may be entirely or partially performed in the form of a computer program product.

The computer program product includes one or more executable instructions. When the executable instructions are loaded and executed on a computer, the procedures or functions according to the embodiments of this application are all or partially generated. The computer may be a general-purpose computer, a special-purpose computer, a computer network, or another programmable apparatus. The executable instructions may be stored in a non-transitory computer-readable storage medium or may be transmitted from one non-transitory computer-readable storage medium to another non-transitory computer-readable storage medium. For example, the executable instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, such as a server or a data center in which one or more usable mediums are integrated. The usable medium may be a magnetic medium (for example, a floppy disk, a hard disk, or a magnetic tape), an optical medium (for example, a DVD), a semiconductor medium (for example, a solid state disk (SSD)), or the like. A person of ordinary skill in the art may understand that, all or some steps in the methods in the foregoing embodiments may be performed by a program instructing related hardware. The program may be stored in a computer readable storage medium.

In some embodiments, the computer-readable storage medium may be a memory such as an FRAM, a ROM, a PROM, an EPROM, an EEPROM, a flash memory, a magnetic memory, a compact disc, or a CD-ROM, or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

Based on the above, the following technical effects can be achieved through the embodiments of this application:

1. Through the valid times, dynamic control of the NF entities is implemented, overheads caused by signaling are also saved, and transmission of invalid data is reduced.

2. For operators of NF entities, capacity of a network system can be improved, electric energy consumption is reduced, and competitiveness of the operators is enhanced.

For example, on workdays, users generally work in business districts during the day, and return to their homes at night (most of which are not in the business districts). Therefore, operators may partially disable NF entities in the non-business districts during the day on workdays, and partially disable NF entities in the business districts at night on workdays, to save electric energy.

3. According to data of at least one dimension included in the second request, the N first NF entities are screened to obtain the third NF entity, which effectively meets the service communication requirements of the second NF entity, Based on the above, the second NF entity may screen the third NF entities according to at least one of the valid time information, the entity capacity information, and the entity priority information to obtain the fourth NF entity, thereby further improving the communication effect of service communication.

4. By updating the valid times, the configuration flexibility of the valid times of the NF entities and the use accuracy of a consumer are ensured.

5. After the valid time expires, the control function entity or the second NF entity directly deletes, without notifying another entity, relevant information of an NF entity of which the valid time expires, thereby saving network overheads caused by notification signaling, and also implementing time-based automatic control of the NF entities.

The communication method, the communication apparatus, the control function entity, and the NF entity provided in the embodiments of this application are described above in detail. Although the principles and implementations of this application are described by using specific examples in this specification, the descriptions of the foregoing embodiments are merely intended to help understand the method and the core idea of the embodiments of this application. Meanwhile, a person skilled in the art may make modifications to the specific implementations and application range according to the idea of the embodiments of this application. Based on the above, the content of this specification shall not be construed as a limitation to the embodiments of this application.

INDUSTRIAL PRACTICABILITY

In the embodiments of this application, the first NF entity provides, for the control function entity, the first valid time in which the first NF entity provides the service, and the second NF entity then requests, from the control function entity, the first valid time of the third NF entity that is included in the N first NF entities and performs communication with the third NF entity within the first valid time. Services of the NF entities are controlled by setting the valid times, which can save overheads caused by signaling and reduce electric energy consumption of the NF entities, and can be applied to various communication networks including entities.

What is claimed is:

1. A communication method, comprising:
receiving, by a control function entity, first requests respectively transmitted by N first network function (NF) entities, each first request comprising a first valid time, the first valid time corresponding to a service provided by a first NF entity transmitting the first request, and N being an integer greater than 0;
receiving, by the control function entity, a second request transmitted by a second NF entity, the second request comprising: a valid time period, a data network name (DNN), location information of a terminal that requests a service from the second NF entity, and an entity type of a first NF entity;
determining, by the control function entity, a list of third NF entities from the N first NF entities, wherein each third NF entity is of the entity type and has a respective first valid time covering the valid time period; and
transmitting, by the control function entity, a first response to the second NF entity, the first response comprising a respective first valid time associated with each respective third NF entity for the second NF entity to perform service communication with the respective third NF entity within the respective first valid time in which the respective third NF entity provides a service.

2. The communication method according to claim 1, wherein respective first valid times of the N first NF entities are the same.

3. The communication method according to claim 1, wherein the method further comprises:
determining, by the control function entity, a third NF entity from the list of third NF entities according to content comprised in the second request.

4. The communication method according to claim 1, further comprising:
receiving, by the control function entity, third requests respectively transmitted by M first NF entities, the third request comprising a second valid time in which a first NF entity transmitting the third request provides a service, and M being an integer greater than 0 and less than or equal to N; and
correspondingly updating, by the control function entity, respective first valid times of the M first NF entities according to M second valid times.

5. The communication method according to claim 4, wherein M is equal to 1.

6. The communication method according to claim 1, further comprising:
monitoring, by the control function entity, the respective first valid times of the N first NF entities; and
deleting relevant information of Q first NF entities when first valid times of the Q first NF entities expire, the relevant information comprising the first valid times of the Q first NF entities, Q being an integer greater than 0 and less than or equal to N.

7. The communication method according to claim 1, wherein:
the first NF entity is an NF network element, an NF service module, or a service communication proxy (SCP); and
the second NF entity is an NF network element, an NF service module, or an SCP.

8. A control function entity, comprising: a transceiver, a processor, and a memory, the memory being configured to store executable instructions, the processor being configured to, when executing the executable instructions, perform a plurality of operations including:
receiving, via the transceiver, first requests respectively transmitted by N first network function (NF) entities, each first request comprising a first valid time, the first valid time corresponding to a service provided by a first NF entity transmitting the first request, and N being an integer greater than 0;
receiving, via the transceiver, a second request transmitted by a second NF entity, the second request comprising: a valid time period, a data network name (DNN), location information of a terminal that requests a service from the second NF entity, and an entity type of a first NF entity;

determining a list of third NF entities from the N first NF entities, wherein each third NF entity is of the entity type and has a respective first valid time covering the valid time period; and transmitting, via the transceiver, a first response to the second NF entity, the first response comprising a respective first valid time associated with each respective third NF entity for the second NF entity to perform service communication with the respective third NF entity within the respective first valid time in which the respective third NF entity provides a service.

9. The control function entity according to claim 8, wherein respective first valid times of the N first NF entities are the same.

10. The control function entity according to claim 9, wherein the plurality of operations further comprise:

determining a third NF entity from the list of third NF entities according to content comprised in the second request.

11. The control function entity according to claim 8, wherein the plurality of operations further comprise:

receiving, via the transceiver, third requests respectively transmitted by M first NF entities, the third request comprising a second valid time in which a first NF entity transmitting the third request provides a service, and M being an integer greater than 0 and less than or equal to N; and correspondingly updating respective first valid times of the M first NF entities according to M second valid times.

12. The control function entity according to claim 11, wherein M is equal to 1.

13. The control function entity according to claim 8, wherein the plurality of operations further comprise:

monitoring the respective first valid times of the N first NF entities; and deleting relevant information of Q first NF entities when first valid times of the Q first NF entities expire, the relevant information comprising the first valid times of the Q first NF entities, Q being an integer greater than 0 and less than or equal to N.

14. The control function entity according to claim 8, wherein the first NF entity is an NF network element, an NF service module, or a service communication proxy (SCP); and the second NF entity is an NF network element, an NF service module, or an SCP.

15. A non-transitory computer-readable storage medium, comprising executable instructions, the executable instructions, when executed by a processor of a computer acting as a control function entity, causing the computer to perform a plurality of operations including:

receiving, via a transceiver of the computer, first requests respectively transmitted by N first network function (NF) entities, each first request comprising a first valid time, the first valid time corresponding to a service provided by a first NF entity transmitting the first request, and N being an integer greater than 0;

receiving, via the transceiver of the computer, a second request transmitted by a second NF entity, the second request comprising: a valid time period, a data network name (DNN), location information of a terminal that requests a service from the second NF entity, and an entity type of a first NF entity;

determining a list of third NF entities from the N first NF entities, wherein each third NF entity is of the entity type and has a respective first valid time covering the valid time period; and transmitting, via the transceiver of the computer, a first response to the second NF entity, the first response comprising a respective first valid time associated with each respective third NF entity for the second NF entity to perform service communication with the respective third NF entity within the respective first valid time in which the respective third NF entity provides a service.

16. The non-transitory computer-readable storage medium according to claim 15, wherein the plurality of operations further comprise:

receiving, via the transceiver of the computer, third requests respectively transmitted by M first NF entities, the third request comprising a second valid time in which a first NF entity transmitting the third request provides a service, and M being an integer greater than 0 and less than or equal to N; and correspondingly updating respective first valid times of the M first NF entities according to M second valid times.

17. The non-transitory computer-readable storage medium according to claim 15, wherein the plurality of operations further comprise:

monitoring the respective first valid times of the N first NF entities; and deleting relevant information of Q first NF entities when first valid times of the Q first NF entities expire, the relevant information comprising the first valid times of the Q first NF entities, Q being an integer greater than 0 and less than or equal to N.

* * * * *